(12) United States Patent
Ibbotson

(10) Patent No.: US 12,714,951 B2
(45) Date of Patent: Aug. 25, 2026

(54) OIL AND FUEL COLLECTOR

(71) Applicant: Manvers Engineering Limited, Barnsley (GB)

(72) Inventor: Christopher Ibbotson, Barnsley (GB)

(73) Assignee: Manvers Engineering Limited, Barnsley (GB)

( * ) Notice: Subject to any disclaimer, the term of this patent is extended or adjusted under 35 U.S.C. 154(b) by 660 days.

(21) Appl. No.: 18/040,437

(22) PCT Filed: Aug. 3, 2021

(86) PCT No.: PCT/EP2021/071699
§ 371 (c)(1),
(2) Date: Feb. 3, 2023

(87) PCT Pub. No.: WO2022/029143
PCT Pub. Date: Feb. 10, 2022

(65) Prior Publication Data

US 2023/0285876 A1 Sep. 14, 2023

(30) Foreign Application Priority Data

Aug. 3, 2020 (GB) ..................................... 2012048

(51) Int. Cl.
*B01D 17/02* (2006.01)
*B01D 39/16* (2006.01)
(Continued)

(52) U.S. Cl.
CPC ..... *B01D 17/0202* (2013.01); *B01D 39/1623* (2013.01); *B01D 39/2058* (2013.01);
(Continued)

(58) Field of Classification Search
None
See application file for complete search history.

(56) References Cited

U.S. PATENT DOCUMENTS 6,589,904 B1 * 7/2003 Iwasaki .................. H01G 11/34
423/447.5

FOREIGN PATENT DOCUMENTS

CN 107823916 A 3/2018
GB 2428032 A 1/2007
(Continued)

OTHER PUBLICATIONS

International Search Report and Written Opinion for International Application No. PCT/EP2021/071699, dated Nov. 11, 2021, (11 pages), European Patent Office, Rijswijk, Netherlands.

*Primary Examiner* — Hayden Brewster
(74) *Attorney, Agent, or Firm* — WOMBLE BOND DICKINSON (US) LLP

(57) ABSTRACT

There is disclosed a collector for machine fluids, comprising a mat having a perimeter wall upstanding therefrom, the mat and/or the wall comprising oleophilic material and the wall being water-permeable, so that water falling into the collector within the perimeter wall can escape therefrom, while the machine fluids are retained by said oleophilic material and wherein the collector comprises at least one composite component for machine fluid retention comprising at least three layers wherein at least one layer comprises activated carbon and wherein this layer is secured within the composite between two layers of porous material mechanically bonded to each other, preferably via needle punching, through the activated carbon layer. The collector has high efficiency in removing PAHs and other aromatics from oil/fuel contaminated water.

27 Claims, 4 Drawing Sheets

(51) Int. Cl.

| | |
|---|---|
| ***B01D 39/20*** | (2006.01) |
| ***B01J 20/20*** | (2006.01) |
| ***B01J 20/26*** | (2006.01) |
| ***B01J 20/28*** | (2006.01) |
| ***B32B 3/08*** | (2006.01) |
| ***B32B 5/02*** | (2006.01) |
| ***B32B 5/06*** | (2006.01) |
| ***B32B 5/26*** | (2006.01) |
| ***C02F 1/28*** | (2023.01) |
| ***C02F 1/40*** | (2023.01) |
| *C02F 101/32* | (2006.01) |
| *C02F 103/00* | (2006.01) |

(52) U.S. Cl.

CPC .......... *B01D 39/2065* (2013.01); *B01J 20/20* (2013.01); *B01J 20/261* (2013.01); *B01J 20/28038* (2013.01); *B32B 3/08* (2013.01); *B32B 5/022* (2013.01); *B32B 5/067* (2021.05); *B32B 5/073* (2021.05); *B32B 5/267* (2021.05); *C02F 1/283* (2013.01); *C02F 1/288* (2013.01); *C02F 1/40* (2013.01); *B01D 2239/0407* (2013.01); *B01D 2239/0421* (2013.01); *B01D 2239/0618* (2013.01); *B01D 2239/0627* (2013.01); *B01D 2239/0659* (2013.01); *B01D 2239/0663* (2013.01); *B01D 2239/1233* (2013.01); *B32B 2250/20* (2013.01); *B32B 2250/40* (2013.01); *B32B 2262/0253* (2013.01); *B32B 2262/106* (2013.01); *B32B 2262/16* (2021.05); *B32B 2264/108* (2013.01); *B32B 2264/50* (2020.08); *B32B 2307/726* (2013.01); *B32B 2307/728* (2013.01); *C02F 2101/327* (2013.01); *C02F 2103/001* (2013.01)

(56) References Cited

FOREIGN PATENT DOCUMENTS

| | | | |
|---|---|---|---|
| WO | WO-97/06222 | A1 | 2/1997 |
| WO | WO-2015/015192 | A1 | 2/2015 |
| WO | WO-2019/081248 | A1 | 5/2019 |

* cited by examiner

OIL AND FUEL COLLECTOR

CROSS REFERENCE TO RELATED APPLICATIONS

This application is a National Stage Application, filed under 35 U.S.C. § 371, of International Application No. PCT/EP2021/071699, filed Aug. 3, 2021, which international application claims priority to and the benefit of GB Application No. 2012048.1, filed Aug. 3, 2020; the contents of both of which are hereby incorporated by reference in their entirety.

BACKGROUND

Related Field

This invention relates to an absorbent oil and fuel collector especially for collecting material from chemical or hydrocarbon spills or leakages and in particular those spills that may occur in the presence of water, which needs to be separated from the chemical or hydrocarbon materials.

Description of Related Art

Leakage or accidental spillage of fluids such as chemicals or oil from machinery, in particular portable or automotive machinery used in civil engineering projects, or static machinery such as electrical and other transformers or from stationary automotive vehicles can lead to pollution of the ground. For example, engine oil, diesel fuel oil and hydraulic fluids can leak from such equipment as a catastrophic leakage or low persistent leakage over relatively long periods of time and these leakages can cause serious environmental damage. It is possible to have a leakage that may be a combination of leaked materials either from storage or operating machinery e.g. a mixture of hydrocarbon based lubricants and fuel materials such as diesel or petrol from machinery. There are increasingly stringent requirements for dealing with ground contamination which can be very costly for any contractor or company responsible for the leakage. In a similar fashion, chemicals may leak and be problematic.

Various approaches have been investigated to address these leakage problems and to protect the environment. One solution has been to provide various means to collect and or trap hydrocarbon leakage and this has typically taken the form of collector beneath the machinery to collect and retain any fluids escaping from the machinery or spilled near it. One such oil collector is described in GB2428032. This portable collector comprises an integrated mat having a self-supporting perimeter wall upstanding from an impermeable base layer. The mat and wall comprise a layer of oleophilic material. The material of the wall is water permeable and any water, such as rain water, falling on the mat escapes through the water permeable wall. Oily fluids are retained by the oleophilic material for later disposal or reuse. Such a device is designed to deal with a further problem in that a large quantity of leaking equipment is exposed to the elements especially rainfall and any oil collecting solution for low quantities of oil leakage must also allow passage of relatively and sometimes significantly larger quantities of water. This water will inevitably be contaminated with oil from the leaking machinery and so any device must be able to remove this oil contamination as the contaminated water passes through or from it. These oil collector devices may utilise an additional oil/hydrocarbon absorbent mat comprising oleophilic material placed on top of the integrated mat and providing additional oil/hydrocarbon absorption capacity. Whilst these collectors are highly efficient and meet most needs they are unable to retain certain materials under more challenging environmental conditions. Particularly problematic is the retention of polyaromatic hydrocarbons and similar toxic materials within the collector and their removal from the water that is allowed to pass from the collector and into various waterways. The various national requirements to meet low levels of pollution have been particularly challenging to achieve with simple containment devices that are portable and allow efficient and effective use and reuse with movable or static machinery.

There is therefore a continuing need for alternative and/or more effective solutions for oil/hydrocarbon collectors and water separators that can meet the most stringent operating conditions/environments and that are easily portable.

BRIEF SUMMARY

The present invention is directed to a collector for machine fluids, comprising a mat having a perimeter wall upstanding therefrom, the mat and/or the wall comprising oleophilic material and the upstanding wall being water-permeable, so that water falling into the collector within the perimeter wall can escape therefrom, while the machine fluids are retained by said oleophilic material and wherein the collector comprises at least one composite component for machine fluid retention comprising at least three layers wherein at least one layer comprises activated carbon and wherein this layer is secured within the composite between two layers of porous material mechanically bonded to each other through the activated carbon layer.

The mechanical bonding between these adjacent layers may be achieved through the use of one or more of the following mechanical bonding techniques; needle punching, stitch bonding or hydroentanglement. It is preferred that the adjacent layers are mechanically bonded to each other via needle punching. Mechanical bonding is distinct from adhesive bonding, which is preferably avoided for bonding the porous layers adjacent to the activated carbon layer and/or to each other. However, the porous layers individually may comprise adhesively bonded material or the composite may be adhesively bonded to other components of the collector. Mechanical bonding requires the interlocking of material from and between the porous material layers and/or the use of a third material in the form of for example a thread or staple mechanically securing the porous layers to each other. It is preferred that the mechanical bonding is as a result of the interlocking of material from and between the porous layers. It is possible to use one or more of these mechanical bonding techniques in combination with flame lamination of the layers, however it is preferred that the composite component of the present invention is manufactured without the use of flame lamination and most preferably is manufactured using needle punching.

The porous layers may comprise woven and/or non-woven materials and preferably comprise non-woven materials. Preferably these layers are non-woven fibrous layers that are primarily oleophilic in nature but are hydrophobic and porous enough so that water with or without hydrocarbon contamination may pass therethrough. In one embodiment one of the layers may be mechanically bonded to or replaced by a porous hydrophilic layer and this layer may be a non-woven material. In this embodiment any water and hydrocarbon/oil mixture will first pass through the oleophilic layer and a proportion of the oil/hydrocarbon may be retained in the layer and separated from the water. The oil/hydrocarbon contaminated water remaining may then pass through to the middle layer of activated carbon and any remaining oil/hydrocarbon or PAH or other toxic impurities are removed from this mixture by the activated carbon layer. Purified water is then able to pass from this layer with ease into and through the second porous layer and especially the hydrophilic layer, which whilst allowing water to pass therethrough repels the oil/hydrocarbon and forces this back into the activated carbon and/or oleophilic layer. This stack of mechanically bonded multiple layers is able to therefore act as a graduated filter for the removal of oil/hydrocarbon from water.

Thus, the porous non-woven layer materials incorporated into the composite component may be broadly defined as sheet or web structures bonded together by entangling fiber or filaments (and by perforating films) mechanically, thermally or chemically. They are flat or tufted porous sheets that are made directly from separate fibers, molten plastic or plastic film. They are preferably not made by weaving or knitting and do not require converting the fibers to yarn.

These porous nonwovens are typically manufactured by putting small fibers together in the form of a sheet or web and then binding them either mechanically (as in the case of felt, by interlocking them with serrated needles such that the inter-fiber friction results in a stronger fabric), via adhesive, or thermally often with use of a binder material. Examples of suitable non-woven materials include staple nonwovens, melt-blown nonwovens, spun laid nonwovens, flash spun, spun jet, air-laid, wet-laid and other well-known forms. In many of these forms the laid fibre requires further treatment in the form of bonding of fibres to provide physical integrity to the nonwoven layer. Several bonding methods may be used and include be used: thermal bonding, hydro-entanglement, ultrasonic pattern bonding, needle punching/needle felting, chemical bonding with binders and melt-blown, where fiber is bonded as air attenuated fibers intertangle with themselves during simultaneous fiber and web formation. All nonwoven materials made by these techniques and which may be further processed to form a mechanical bond with an adjacent layer sandwiching the activated carbon, may be used in the present invention.

One suitable nonwoven is a polypropylene based felt material typically used in the manufacture of oil/hydrocarbon absorbing pads or matts and preferably is 4 denier polypropylene fiber in a nonwoven layer and most preferably is less than 4 denier and most preferably is 3 denier. Another suitable non-woven material is Geotextile-NW12, which is a polypropylene, staple fiber, needle-punched, nonwoven geotextile made with a proprietary additive. The fibers are needled to form a stable network that retains dimensional stability relative to each other. One preferred nonwoven material for one or more of the layers is a spun bond felt.

The activated carbon layer may be in the form of a layer of material such as a woven or non-woven layer of material comprising activated carbon bound within the layer or may be in the form unbound material in the form of fibres and/or particulate materials that is then bound between the porous material layers of the composite. It is preferred that the activated carbon layer comprises particulate and/or fibrous material and most preferably particulate material. This material being retained and secured between two layers of non-woven porous material that are mechanically interlocked with each other preferably through needle punching. The position of the particulate material is effectively fixed after needle punching and interlocking of the two adjacent non-woven layers and through this arrangement the particles and groups of particles are in fixed isolation from each other and in a relatively high local concentration. Contaminated water e.g. with poly aromatic hydrocarbons (PAH) may pass through the non-woven porous layers and when contacted with the activated carbon the PAH and/or other toxic materials are removed and isolated whilst ensuring that the activated carbon remains in fixed isolation within the composite in this location. This arrangement maintains the flow of liquid through the layer and ensures maximum effective utilization of the activated carbon. It is preferred that the activated carbon is used in combination with nonwoven layers comprising 3 denier (3.3 dtex) polymer fibres.

If desired the composite component of the present invention may comprise multiple layers of activated carbon separated by non-woven layers that are mechanically bonded to each other. In addition, the composite component comprising activated carbon may be incorporated into other layered structures where the additional layers have other functions or properties e.g. wear resistance or reactive properties with machine oil components. The composite component of the present invention may be in the form of a replaceable mat or a fixed mat located within the collector. In one embodiment the composite component is in the form of a liner, which comprises a mat bottom with upstanding side-walls of the same material; such a liner, which may be replaceable may be used in combination with prior art collectors such as those described in GB2428032A or may be used with the collector of the present invention. The present invention further provides for a collector as described in GB2428032A comprising such a replaceable composite component liner.

In the context of the present invention machine fluid means and lubricant, fuel or other fluid e.g. transformer or insulating oils, that may be contained within machinery under storage or during operation of the machinery. The machine fluids may also be in storage vessels such as for example drums. Also, envisaged are machine fluid contaminated equipment or machinery e.g. vehicles that may have machine fluid spillage located upon a surface that may then be washed from the vehicle or machinery.

The composite component preferably comprises at least three layers. The top layer or layer facing the interior of the collector comprises porous layer material, preferably machine fluid absorbing material. The middle layer comprises activated carbon. The bottom layer or layer facing the exterior of the collector comprises porous layer material, preferably machine fluid absorbing material. These three layers are mechanically bonded together to provide a robust integral composite component. These porous layers may and preferably do comprise non-woven oleophilic materials such as for example felt based materials that may be used in oil recovery and clean-up. Preferably these layers are manufactured from 3 to 4 denier polypropylene fiber in a nonwoven layer, and most preferably 4 denier polypropylene fiber. All three layers of the composite component may be of similar thickness and preferably the middle layer or core of the composite component comprising activated carbon is thinner than the two porous layers. Preferably the activated carbon layer is determined by the weight per square meter of the activated carbon deposited upon the non-woven layers and is preferably from 200 to 1200 $gm^{-2}$, more preferably 250 to 1100 $gm^{-2}$ and most preferably 300 to 1000 $gm^{-2}$. This relatively thin composite is beneficial in ensuring reasonable flux of water through the composite whilst providing effective reaction to hydrocarbon contact and adsorption of toxic PAH components in water as the water passes from within the collector and through the sidewall or base to the exterior of the collector.

The collector of the present invention may comprise composite component structures within its sidewalls, within its base mat layers, within a replaceable mat or liner for fitting within the interior of the collector to cover the base of the collector and/or interior of the sidewalls or any combination of these arrangements. Preferably the composite component is present as part of the upstanding sidewalls of the collector. It is preferred that the upstanding sidewalls are resiliently compressible and are not rigid; this ensures that vehicles may easily move across the sidewalls and in doing so compress the sidewalls, which are then, due to their resilient nature, able to reform as upstanding sidewalls upon removal of the compressive forces. Preferably the perimeter wall is self-supporting. It is therefore important that the composite component is able to withstand the same compressive impacts and continue to function as a component of the sidewalls. Preferably the interior of the walls comprises a porous foam material and most preferably an open cell reticulated foam material and preferably reticulated foam in the form of a cylinder; this foam material provides physical form to and assists in defining the upstanding sidewall. In addition, the interior of the sidewall may further comprise fibres of an oil loving plastic material, more preferably iso-polyolefin, and most preferably the polyolefin is polypropylene. This fibre material may be arranged at any location within the walls and may preferably encase the reticulated foam wall forming core. Preferably the foam and/or fibres are contained within a permeable fabric cover and preferably the fabric is a woven or nonwoven fabric formed from a plastics material and preferably the plastic material is polypropylene. When present this fibre material is preferably in the form of a nonwoven felt layer and preferably located between the oleophilic foam core and the fabric cover. Preferably, this felt layer is between 1-10 mm in thickness, most preferably 2 to 8 mm in thickness and most preferably 2 to 4 mm in thickness and most preferably comprises nonwoven felt material of density from 100 to 400 g/m$^2$, more preferably 150 to 350 g/m$^2$, more preferably 200 to 350 g/m$^2$, and most preferably 250 to 350 g/m$^2$. The same type of materials may be used to form the composite component porous layers, which may be used in place of the this fibre material In a preferred arrangement the composite component of the present invention may be arranged on either vertical side of the foam core, on both vertical sides of the foam core and/or beneath the foam core or surrounding the foam core.

The mat of the collector preferably comprises an impermeable base layer. It is preferred that the collector is arranged such that all of the hydrocarbon/oil containing water passes through a composite material of the present invention located within and/or at the surface of the self-supporting perimeter walls. In a preferred embodiment a composite layered material of the present invention is located between the felt layer and the core foam/fibre region. In a further embodiment a composite layered material of the present invention is bonded to the interior inward facing surface of the felt layer. In an alternative embodiment a composite layered material of the present invention may incorporate a felt layer as one or more of its layers or replaces the cover bonded felt layer.

The preferred method of manufacture of the composite material of the present invention is to distribute particulate form activated carbon at the desired level of loading as a layer onto a web of a desired fibrous non-woven material and to locate a second web of the nonwoven on top of the particulate form activate carbon layer. This loose multilayered composite is then introduced into a needle punching machine at the desired settings to needle punch the two nonwoven layers together trapping and securing the powder form activated carbon between them. It is preferred that the magnitude of needle punching of the layers in the composite material is kept to a minimum so that the nonwoven layers of the composite are loosely held together and are not tightly compressed within the composite. Ideally the stitch density and punch density are kept to a minimum. The ideal arrangement is where the fibre of the top layer is needled to both layers and the fibre is just protruding from the second layer; the penetration depth is kept to a minimum. In a preferred embodiment when a needle punched felt is used as one of the nonwovens in the composite this is manufactured at a low level of punch density. A preferred example is polypropylene felt, consisting of 3.3 dtex or 4 denier polypropylene fibre of 30 to 50 mm in length to provide a felt density of 285 gm$^{-2}$. The low-density needle punched materials and the low-density needle punched composite ensure the maximum desirable water permeability of the composite within the sidewall of the collector. If the needle punch density is too high the permeability to water is reduced and the efficiency of the composite is reduced. The resulting composite component may then easily incorporate the activated carbon within the desired locations within the collector during its manufacture and will retain the activated carbon at these locations. The composite allows for easy and fixed orientation of particulate activated carbon within the sidewalls of the collector. Thus, in a preferred embodiment the composite component is arranged co-planar with the sidewall material and follows the contour of the sidewall. In a further embodiment the composite component is arranged to be perpendicular to the base of the collector. In a further embodiment the composite component is arranged to be both perpendicular to and co-planer with the base of the collector. In a preferred embodiment the collector comprises two composite component regions, each perpendicular to the collector base and preferably either side of a core sidewall material. Most preferably the composite component is arranged to cover the total internal and/or external surfaces of the sidewall.

In a preferred embodiment the collector sidewall comprises a foam core encased in a composite of the present invention comprising a three layered structure of polypropylene felt and spun bond nonwoven that sandwich activated carbon and the polypropylene felt is needle punched to the spun bond sandwiching the activated carbon between them. The polypropylene felt fibre is preferably 3 denier and the felt has a density of 285 gm$^{-2}$.

BRIEF DESCRIPTION OF THE FIGURES

It should be understood that all and any aspects and embodiments as described herein may be combined in any number of combinations. The invention will now be further illustrated with reference to the following figures detailed description and examples.

DETAILED DESCRIPTION OF VARIOUS EMBODIMENTS

Figure 1:
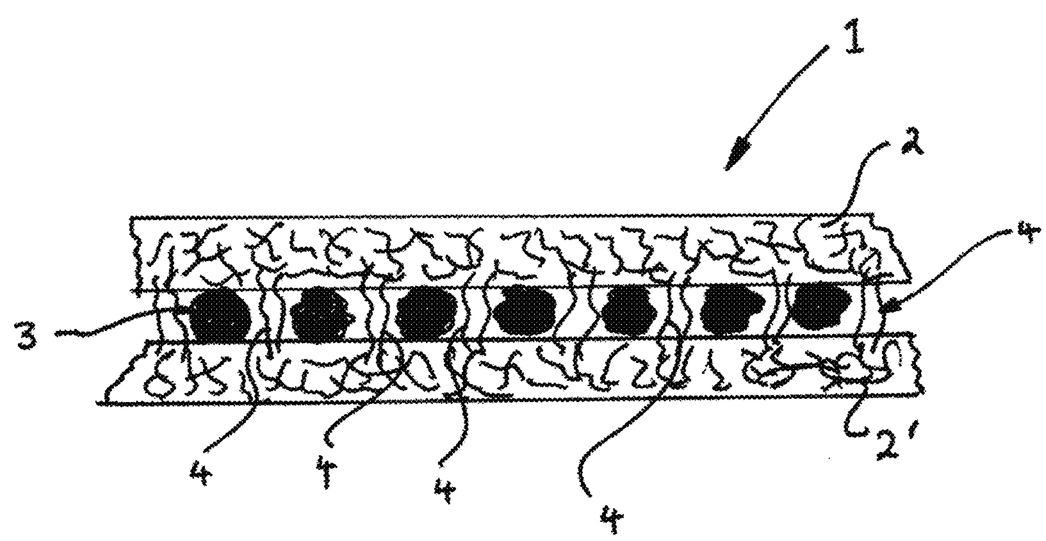
FIG. 1 shows a sectional view of a composite component used in the collector of the present invention.

With reference to FIG. 1, there is shown a composite component (1) for use in the collector of the present invention, comprising three layers (2, 2' and 3). The top and bottom layers (2,2') are made of oil absorbing felt material, which is typically a nonwoven material such as a nonwoven polypropylene felt or similar. Sandwiched between these layers (2, 2') is a further layer (3) of activated carbon. In this example this layer (3) is a layer of discreet particulate activated carbon. This middle layer (3) allows water to pass therethrough but absorbs and prevents the passage of toxic PAH and other components of hydrocarbons and oils. Also shown is the needle punched mechanical connections (4) between the top and bottom layers (2, 2'). These connections (4) consists of fibers from both layers (2, 2') that have become interlocked and form a mechanical bond through the action of needle punching processing of the three layers. It can be seen that the particulate material present in layer (3) is effectively trapped between these mechanical connections (4). This robust and simple arrangement ensures that the composite component has a high level of integrity and stability and that the particulate material is securely retained in the desired location in the collector.

Figure 2:
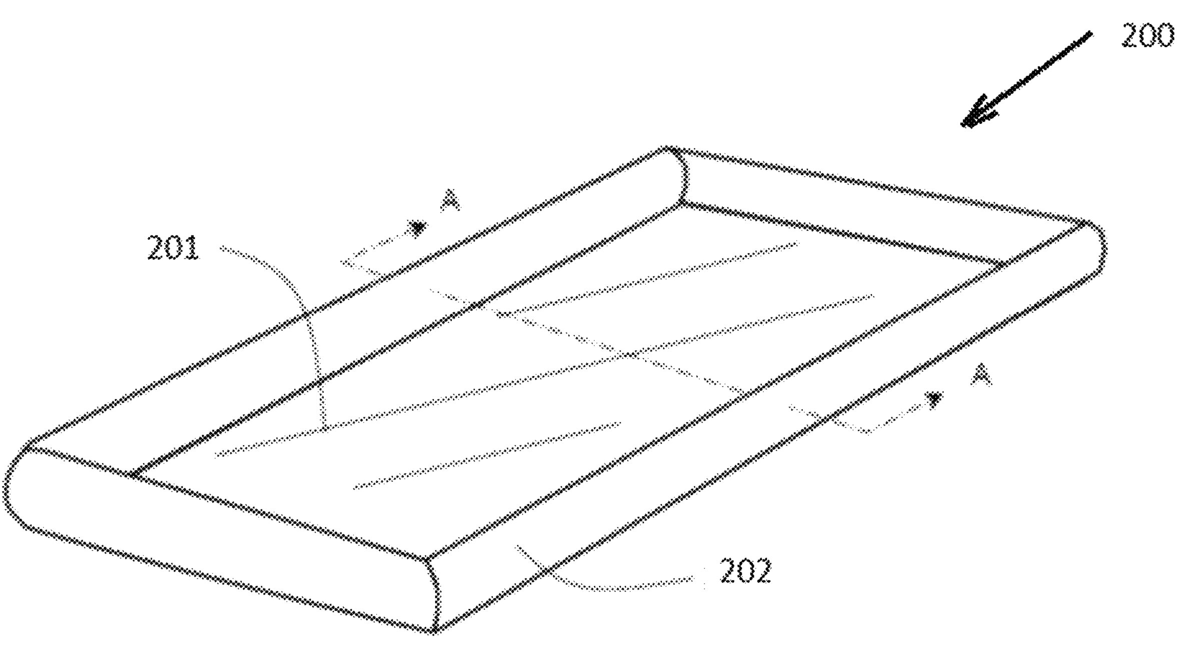
FIG. 2 shows a perspective schematic view of a collector for machine fluids according to the present invention.

Referring to FIG. 2, the collector shown (200) has a rectangular mat (201) having an upstanding wall (202) around its perimeter and secured to the mat (201) at the perimeter. The sidewall structure (202) is manufactured such that it has sufficient rigidity to be self-supporting during use but that it may also be compressed upon the application of pressure as in for example when a vehicle or piece of equipment traverses the sidewall (202) for location upon the mat (201) for operation or use. The self-supporting sidewall (202) after compression and removal of compressive forces is able to decompress to its original or approximately original shape. The combination of the mat (201) and the upstanding sidewall (202) provides for a walled containment area for a vehicle or piece of machinery. The collector may therefore act as a collector of any machine fluids such as oil/hydrocarbons that may escape from the vehicle or machinery. His material is absorbed into the mat or sidewalls of the collector. Any water that falls upon and runs off the vehicle or machinery e.g. rainfall during its external use, will also fall into the same containment area but will pass from this area through the sidewalls (202) to the exterior of the collector (200).

Figure 3:
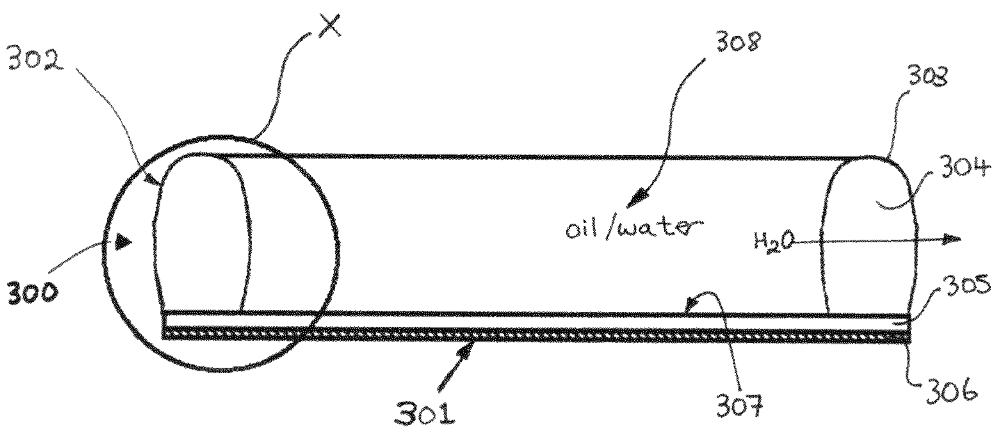
FIG. 3 shows a schematic sectional view along the line A-A of FIG. 2 of a collector according to the present invention without the presence of the required composite component.

Referring to FIG. 3, the collector shown (300) has an upstanding sidewall (302) that is formed as a tubular fabric material structure (303), which is filled within its interior (304) with a tubular foam support material and a machine fluid adsorbing material (not shown). The sidewall (302) is secured to a mat (301), which comprises a felt absorbent layer (305) supported by and secured to an impermeable base layer (306); the top surface of the felt layer (305) is covered with a fabric material (307). During use oil/water fall into the containment area (308) and make contact with the mat (301), the majority of the water will flow from the mat (301) and out of the containment area via the sidewalls (302); any oil/hydrocarbon mixed with this water will be removed by the oleophilic absorbing material within the sidewalls (302). This mixture will also make contact with the mat (301) and in the first instance most of the oil present is absorbed by the top felt layer (305) and residual oily water is then able to pass from the containment area (308) through the sidewalls (302) and exit the collector (300); as it passes through the sidewalls (302) hydrocarbon absorbing material in the sidewalls (302) removes the residual oil and relatively pure water is then able to pass out of the collector (300).

In typical use the machine or vehicle will release machine fluid in the absence of water and this leakage will be absorbed into and retained through immobilization in the top layered region (305) of the mat (301) and/or the sidewalls (302). If there is then any precipitation in the form of for example rain, and this contacts the collector (300), because the leaked machine oil is immobilized in region (305) it is not washed out of the collector (300) but is retained and as the oily water passes from the containment area (308) and through the sidewalls (302) and residual oil is removed by materials in the sidewall (302) before the water passes out of the collector (300). This collector (300) may be used with a removable liner that may be used as the primary oil/hydrocarbon absorbing layer and the other components of the collector (300) are used for secondary oil/hydrocarbon removal after oil/hydrocarbon with or without water has saturated the primary oil/hydrocarbon recovery layer with oil/hydrocarbon. The liner may comprise a layered composite component as described herein. The present invention is therefore in a further embodiment directed to a collector as herein described in combination with a liner pad comprising a layered composite component.

Figure 4:
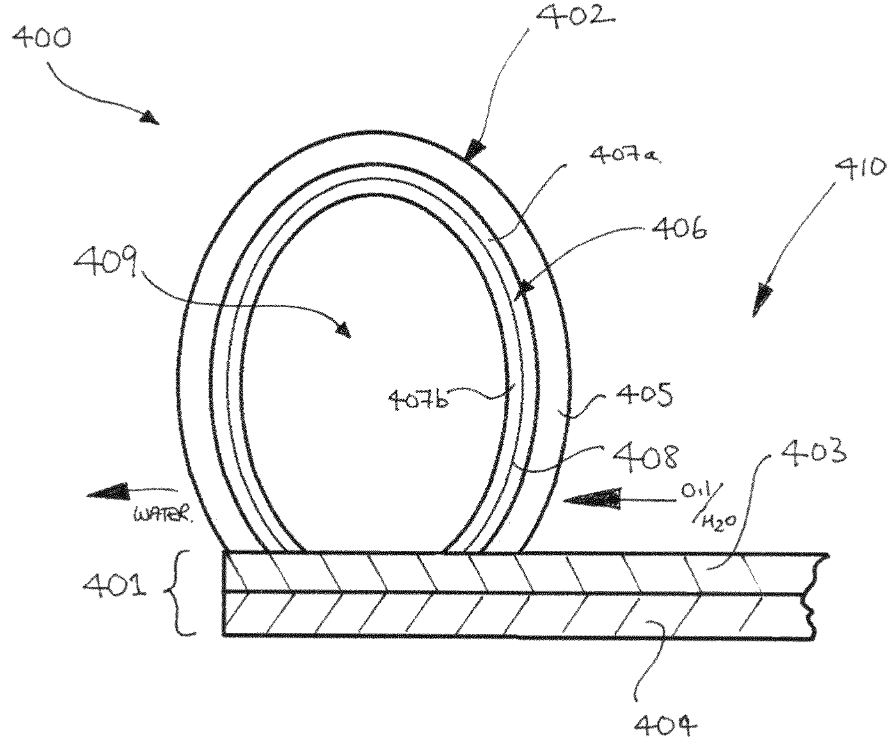
FIG. 4 shows a schematic sectional view of region X of FIG. 3, of a collector according to the present invention, showing one embodiment comprising the composite component material.

Referring to FIG. 4, the collector (400) has an upstanding sidewall (402) formed as a tubular structure. This upstanding sidewall (402) is secured to a mat (401), which has a layer of oil absorbing material (403) secured to an impermeable base layer (404). The exterior of the tubular wall structure (402) is made of a water and oil permeable fabric and located internally to this fabric layer and adjacent to its interior surface is a layer of oil absorbing material (405). Located internally to the oil absorbing layer (405) and adjacent to its interior surface is a layer of composite component material (406) and this composite component material (406) comprises a first and a second oil absorbing material layer (407*a* and 407*b*) that are needle punch bonded to each other sandwiching between them a particulate activated carbon later (408). All of these layered materials are held in position through the presence of a tubular foam body (409) within the core of the upstanding sidewall (402). During use oil will typically fall into the containment area (410) and make contact with the mat (401) and be absorbed into the oil absorbing material layer (403). During rainfall water will wash any residual oil/hydrocarbon from any machinery or vehicle located within the containment area (410) and this will make contact with the mat (401); on contact the majority of the oil will be removed from the water and absorbed into the layer (403) of the mat (401). And oily water will also pass from the mat surface and out of the containment area (410) through the sidewall (402) as indicated by the arrowed direction in FIG. 4. This mixture of oil and water on entering the sidewall (402) will make contact with the oil absorbing layer (405), which will absorb the majority of the oil present in the water mixture. The resulting water with lower levels of oil contamination and including toxic materials such as PAH molecules then passes through the composite component material later (406) where the layers (407*a* and 407*b*) further remove oil in the aqueous stream and where toxic materials such as PAHs are removed by the particulate activated carbon layer (408). This arrangement is highly desirable as these layers and their arrangement enable effective removal of oil from water and removal or significant reduction of other toxic materials such as PAHs, whilst importantly enabling a high flow rate of oil contaminated water into and through the upstanding sidewall (402). This high flow rate is desirable to ensure that oily/water is not held back within the containment area (410) to such an extent that is able to flow over the sidewall (402). In addition this arrangement with the support of the foam (40) or similar interior materials is resiliently compressible and is able to return to the desired form after compression of the sidewall (402) is removed and does so without loss of function of the various layers; loss of function is a problem with other arrangements such as loose filled. The base layer (404) is impermeable and thus prevents any oil/water from passing through the base; all liquids are only able to exit the collector (400) through the upstanding sidewall (402).

Figure 5:
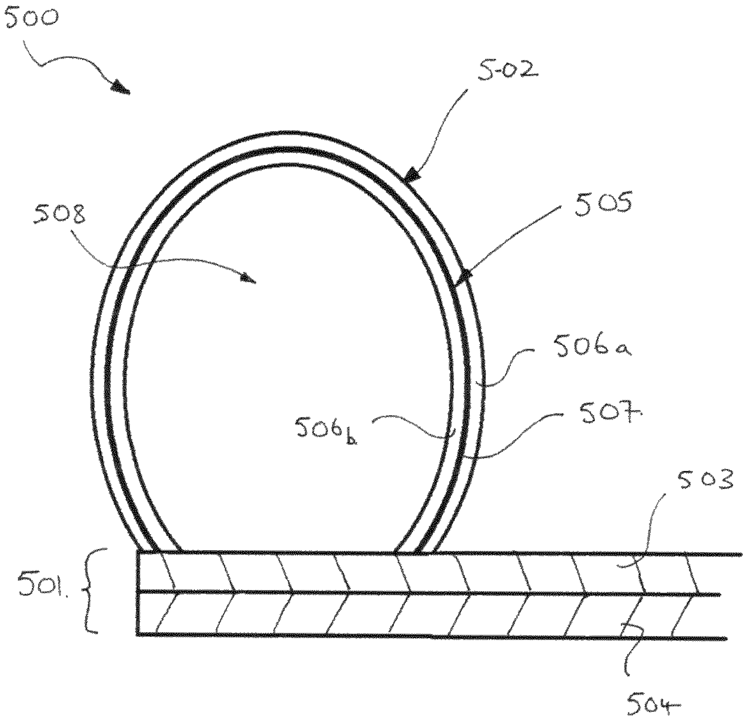
FIG. 5 shows a schematic sectional view of region X of FIG. 3, of a collector according to the present invention, showing one embodiment comprising the composite component material.

Referring to FIG. 5, the collector (500) has an upstanding sidewall (502) formed as a tubular structure. This upstanding sidewall (502) is secured to a mat (501), which has a layer of oil absorbing material (503) secured to an impermeable base layer (504). The exterior of the tubular wall structure (502) is made of a water and oil permeable fabric and located internally to this fabric layer and adjacent to its interior surface is a layer of composite component material (505) and this composite component material (505) comprises a first and a second oil absorbing material layer (506*a* and 506*b*) that are needle punch bonded to each other sandwiching between them a particulate activated carbon later (507). All of these layered materials are held in position through the presence of a tubular foam body (508) within the core of the upstanding sidewall (502). In this embodiment the separate internal oil absorbing layer (405) of FIG. 4 is omitted. The operation of the collector in FIG. 5 is identical to that of FIG. 4 except with the omission of the function of absorbing layer (405), which is now performed by layer (506*a*).

Figure 6:
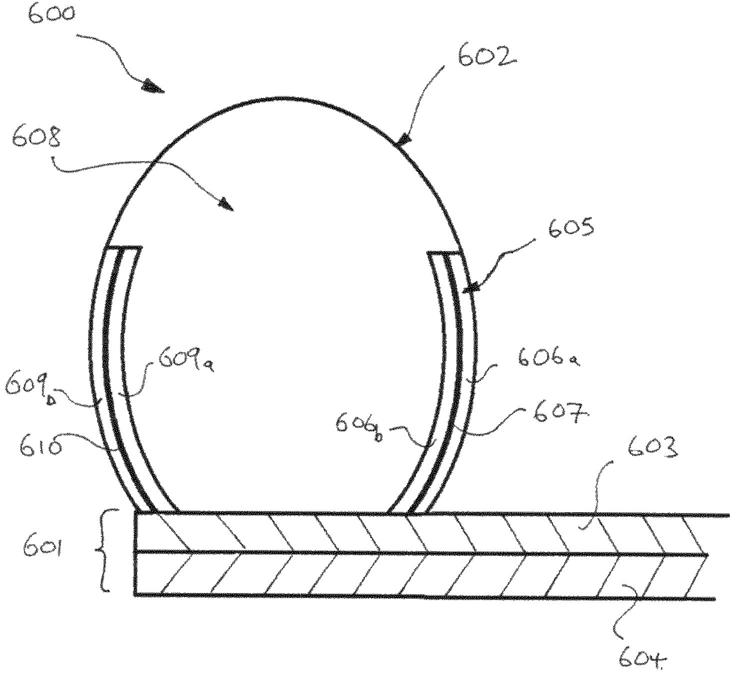
FIG. 6 shows a schematic sectional view of region X of FIG. 3, of a collector according to the present invention, showing one embodiment comprising the composite component material.

Referring to FIG. 6, the collector (600) has an upstanding sidewall (602) formed as a tubular structure. This upstanding sidewall (602) is secured to a mat (601), which has a layer of oil absorbing material (603) secured to an impermeable base layer (604). The exterior of the tubular wall structure (602) is made of a water and oil permeable fabric. In contrast to the embodiment of FIG. 5 the embodiment of FIG. 6 does not have a composite component material layer located internally to the fabric layer, which is adjacent to the whole of its interior surface. In this embodiment there are now two separate layers of composite component material (606*a*, 606*b*, 607 and 609*a*, 609*b*, 610) located at opposite internal surfaces of the fabric layer and retained against its internal surface through the compressive force of the foam body (608). This arrangement functions in the same manner as the embodiment of FIG. 5, but with the need for less composite component material.

Figure 7:
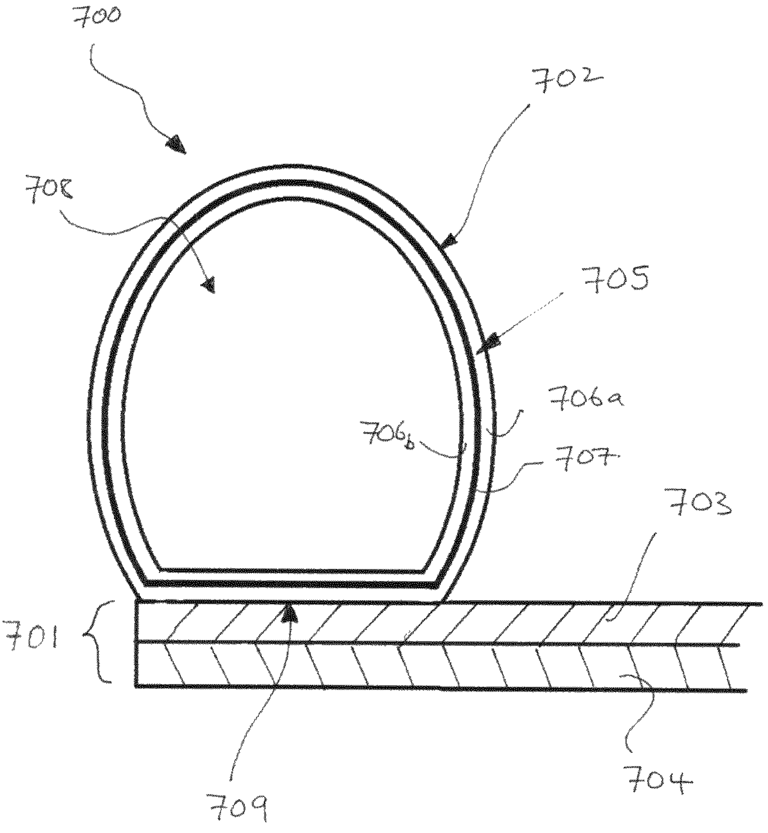
FIG. 7 shows a schematic sectional view of region X of FIG. 3, of a collector according to the present invention, showing one embodiment comprising the composite component material.

Referring to FIG. 7, the collector (700) is identical to the collector (500) of Figure, with the proviso that the composite component material layer (705, consisting of 706*a*, 706*b* and 707) now encompasses the whole of the interior foam body (708) and is now proximate at its base (709) to the top layer (703) of the may (701). This embodiment offers a further pathway through the sidewall (702), through which oil/water mixtures must percolate as the oil/water mixture passes from the interior of the collector (700) through the sidewall (702) and to the exterior.

Figure 8:
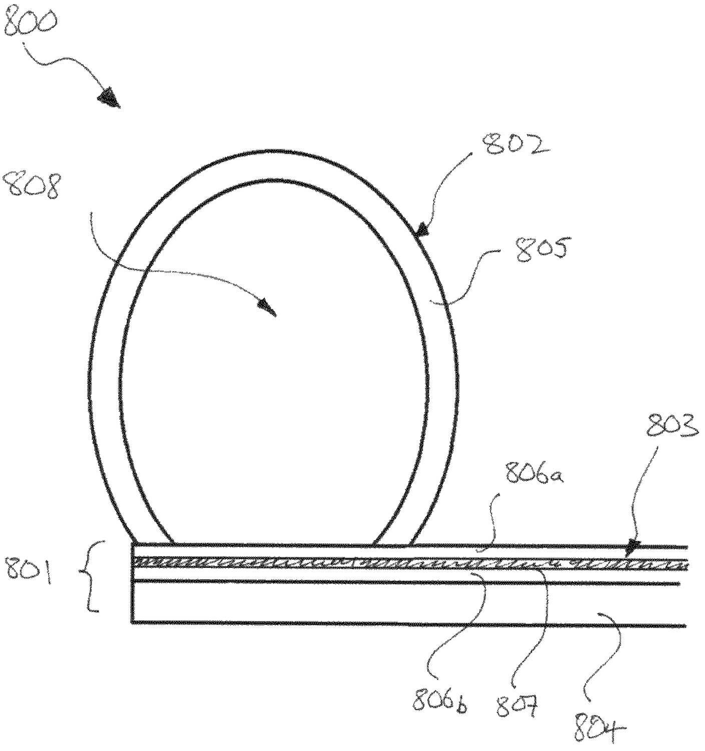
FIG. 8 shows a schematic sectional view of region X of FIG. 3, of a collector according to the present invention, showing one embodiment comprising the composite component material.

Referring to FIG. 8, the collector (800) is in many of its features identical to the collectors of previous Figures with a key difference. It has an upstanding sidewall (802) formed as a tubular structure supported by foam (808) an comprising an oil absorbing layer (805). This upstanding sidewall (802) is secured to a mat (801), with an impermeable base (804) and in which the layer of oil absorbing material (305, 403, 503 or 703) as shown in those Figures is now replaced by a composite component material layer (803) and this composite component material layer (803) comprises a first and a second oil absorbing material layer (806*a* and 806*b*) that are needle punch bonded to each other sandwiching between them a particulate activated carbon later (807). During use oil/water mixtures fall onto the mat (801) and oil is absorbed and separated from the water, which is able to flow through this layer towards the sidewall and in addition any toxic materials such as PAHs or similar are retained within the particulate activated carbon layer (807).

The features of the embodiments as shown on the Figures may be used in combination with one or more of the features of any of these examples in a collector; so for example the mat of FIG. 8 may be used with the collectors of any of FIGS. 3 to 7

In all of the collector embodiments sidewalls may be continuous, or may be constructed in sections joined together at the corners, again according to the desired plan shape of the collector. The collector may have any desirable shape. The sidewall may be formed from a fabric tube stuffed with a foam body and/or polypropylene fibres and provided with a flattened base for attachment to the mat around the periphery thereof. The impermeable base may be plastic such as for example, of the type of plastics sheeting used as groundsheets and for temporary shelters and the like. The fabric tube may be a water- and oil-permeable plastics woven or nonwoven textile material, for example of the type used in making overalls.

The sidewalls may be attached to the mat by stitching, by adhesive, for example a hot-melt adhesive, or by welding, for example using radiofrequency welding. Similar methods may be employed to secure the different layers of the mat together.

It is understood that any embodiment described herein may be used in combination with one or more of each of the other embodiments and all of these combination of embodiments are within the scope of the present invention.

All of the features disclosed in this specification for each and every embodiment (including any accompanying claims, abstract and drawings), and/or all of the steps of any method or process so disclosed, may be combined in any combination, except combinations where at least some of such features and/or steps are mutually exclusive.

EXAMPLES

A variety of machine fluid collectors were evaluated for their performance in retaining various machine fluids under a variety of conditions in order to determine if they were able to meet stringent environmental/regulatory standards. These standards were:

a) Alberta Tier 1 and Tier 2 Guidelines—(Tier 1 and Tier 2)

b) BC Contaminated Sites Regulation (CSR) Schedule 3.2 Groundwater Standards—(BC CSR), and c) Federal CCME Water Quality Guidelines—(CCME)

The testing was carried out under two sets of conditions. The first set of conditions was designed to simulate 248 mm of rainfall in 20 minutes, which is more rain than any historical rainfall event in the history of Canada and greatly exceeds what would be classified as a 100-year rainfall event for Canada. The second was a less stringent test simulating 144 mm of rainfall in 20 minutes, which is close to a 100 year rainfall event in Australia.

The performance under these conditions was assessed for the following machine fluids (petroleum hydrocarbon compound: PHC):

a) Hydraulic Oil (Caterpillar Hydro Advance 10 hydraulic oil)—Hydraulic b) 10W30 weight motor oil (NAPA high performance)—Motor c) Diesel Gasoline (motor fuel)—Diesel The following testing protocols were used:

Canadian Tests

1. The collector was saturated with water simulating 33 mm or rainfall.
2. A sample of water that passed through the collector was collected for testing as a blank sample.
3. One liter of the PHC was added to the collector.
4. Then 85 liters of water was added in 20 minutes to the collector to simulate an extreme rainfall event.
5. A sample of the fluid exiting the collector was taken and this was labelled as PHC 50% Sample.
6. A second liter of PHC was added to the collector.
7. A further 85 liters of water was added in 20 minutes to simulate a second extreme rainfall event.
8. A second sample of the fluid exiting the collector was taken and was labelled as PHC 100% Sample.

Australian Tests

1. The collector was saturated with water simulating 33 mm or rainfall.
2. A sample of water that passed through the collector was collected for testing as a blank sample.
3. Two liters of diesel was added to the collector.
4. Then sufficient water was added over 20 minutes to the collector to simulate an extreme rainfall event of 144 mm of rainfall in 20 minutes.
5. A sample of the fluid exiting the collector was taken and this was labelled as PHC 50% Sample.
6. A further two liters of diesel was added to the collector.
7. A further amount of water was added over 20 minutes to the collector to simulate an extreme rainfall event of 144 mm of rainfall in 20 minutes
8. A second sample of the fluid exiting the collector was taken and was labelled as PHC 100% Sample.

The water samples were tested for the presence of various contaminants normally present in machine fluids such as for example poly aromatic hydrocarbons, ethylbenzene, xylenes and toluene amongst others and it was determined if the performance of the collectors was a pass or fail in relation to the various regulations and guidelines.

Example 1

A machine fluid collector of the prior art as described in GB2428032 was tested with the results shown in Table 1.

TABLE 1

| | Canadian Tests | | | | | | | | Australian Tests | | | | | | | |
|---|---|---|---|---|---|---|---|---|---|---|---|---|---|---|---|---|
| | 50% Sample | | | | 100% Sample | | | | 50% Sample | | | | 100% Sample | | | |
| | Tier 1 | Tier 2 | BC CSR | CCME | Tier 1 | Tier 2 | BC CSR | CCME | Tier 1 | Tier 1 | BC CSR | CCME | Tier 1 | Tier 1 | BC CSR | CCME |
| Hydraulic | PASS | PASS | PASS | PASS | PASS | PASS | PASS | PASS | PASS | PASS | PASS | PASS | PASS | PASS | PASS | PASS |
| Motor | PASS | PASS | PASS | PASS | PASS | PASS | PASS | PASS | PASS | PASS | PASS | PASS | PASS | PASS | PASS | PASS |
| Diesel | FAIL | FAIL | FAIL | FAIL | FAIL | FAIL | FAIL | FAIL | PASS | PASS | PASS | PASS | PASS | PASS | PASS | PASS |

Across the board under all conditions this collector met the regulatory requirements when used to collect either a hydraulic or motor oil. However, with diesel this collector was found to fail the regulatory requirements under the most severe Canadian conditions. The concentrations of naphthalene and ethylbenzene exceeded all of the regulations and guidelines with the exception of the BC CSR. The BC CSR was exceeded for LEPH and Toluene. The Tier 1 was also exceeded for total xylenes and the CCME was also exceeded for Toluene.

Example 2

A machine fluid collector as described in GB2428032 was manufactured with the modification of incorporating 100 $gm^{-2}$ of activated charcoal (Aquacarb™ 207C, a coconut based granular activated carbon supplied by Chemviron Carbon), which was hand laid within the sidewall structure of the collector.

As with the collector of Example 1 this collector was found to fail the diesel related tests under the most extreme Canadian conditions.

Example 3

A machine fluid collector as described in GB2428032 was manufactured with the modification of incorporating a 5 mm section of a foam impregnated with activated carbon within the sidewall structure of the collector. These foams are commercially available and are typically used for removal of gaseous organic toxins.

As with the collector of Example 1 this collector was found to fail the diesel related tests under the most extreme Canadian conditions.

Example 4

A machine fluid collector as described in GB2428032 was manufactured with the modification of incorporating an oil absorbing felt layer within the sidewalls of the collector that had been manufactured used 3 denier polypropylene fibres. oil absorbing mm section of a foam impregnated with activated carbon within the sidewall structure of the collector. These foams are commercially available and are typically used for removal of gaseous organic toxins.

As with the collector of Example 1 this collector was found to fail the diesel related tests under the most extreme Canadian conditions.

Example 5

A machine fluid collector similar to that described in GB2428032 was manufactured with the modification of incorporating a composite component consisting of two layers of polypropylene felt manufactured from 3 denier polypropylene fibres that were needle punched together to trap a layer of activated charcoal (Aquacarb™ 207C, a coconut based granular activated carbon supplied by Chemviron Carbon. The activated carbon was present at an amount of 400 $gm^{-2}$. The composite component was located within the sidewall of the collector as per the arrangement described in FIG. 4.

In contrast to the collectors of Examples 1 to 4 this collector was able to meet the regulated standards under the most severe Canadian conditions and also the Australian conditions.

Example 6

A machine fluid collector similar to that described in GB2428032 was manufactured with the modification of incorporating a composite component consisting of two layers of polypropylene felt manufactured from 3 denier polypropylene fibres that were needle punched together to trap a layer of activated charcoal (Aquacarb™ 207C, a coconut based granular activated carbon supplied by Chemviron Carbon. The activated carbon was present at an amount of 300 $gm^{-2}$. The composite component was located within the sidewall of the collector as per the arrangement described in FIG. 4.

In contrast to the collectors of Examples 1 to 4 this collector was able to meet the regulated standards under the most severe Canadian conditions and also the Australian conditions.

All of the features disclosed in this specification for each and every embodiment (including any accompanying claims, abstract and drawings), and/or all of the steps of any method or process so disclosed, may be combined in any combination, except combinations where at least some of such features and/or steps are mutually exclusive.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise. Features, integers, characteristics, compounds described in conjunction with a particular aspect, embodiment or example of the invention are to be understood to be applicable to any other aspect, embodiment or example described herein unless incompatible therewith. Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A collector for machine fluids, comprising:

a mat having an impermeable base layer, and a perimeter wall upstanding from the mat, the mat and the perimeter wall comprising oleophilic material and the perimeter wall being water-permeable, so that water falling into the collector within the perimeter wall can escape therefrom, while the machine fluids are retained by said oleophilic material, wherein;

the collector further comprises at least one composite component for machine fluid retention comprising at least three layers, at least one layer of the at least three layers comprises activated carbon, and the at least one layer is secured within the composite between two layers of porous material mechanically bonded to each other through the activated carbon layer.

2. The collector according to claim 1, wherein the layers of porous material are woven and/or non-woven materials.

3. The collector according to claim 1, wherein at least one of the layers of porous material are non-woven materials.

4. The collector according to claim 1, wherein at least one of the layers of porous material is oleophilic.

5. The collector according to claim 1, wherein at least one of the layers of porous material is hydrophilic.

6. The collector according to claim 1, wherein the layers of porous material are arranged as an outer and inner layer and the inner layer of porous material is hydrophilic.

7. The collector according to claim 1, wherein the composite comprises multiple layers of activated carbon material.

8. The collector according to claim 1, wherein the mechanical bonding between layers is achieved through use of one or more of the following mechanical bonding techniques: needle punching, stitch bonding or hydroentanglement.

9. The collector according to claim 1, wherein the mechanical bonding between layers is achieved through use of needle punching.

10. The collector according to claim 1 comprising a liner that comprises one or more composite components.

11. The collector according to claim 1, wherein at least one of the porous layers comprises three denier polyolefin fibres.

12. The collector according to claim 1, wherein at least one of the layers of porous material is a nonwoven polyolefin felt.

13. The collector according to claim 1, wherein at least one of the layers of porous material is a spun bond nonwoven.

14. The collector according to claim 1, wherein the perimeter wall comprises a foam core with at least one composite component in contact with the foam core.

15. The collector according to claim 1, wherein the perimeter wall comprises a fabric cover and the composite component lines the interior surfaces of the fabric cover.

16. The collector according to claim 1, wherein the perimeter wall comprises a resiliently compressible core material encased with composite component.

17. The collector according to claim 1, wherein the composite component is located adjacent to an interior surface of the perimeter wall that is adjacent to the collection zone.

18. The collector according to claim 1, wherein a composite component is located at the base of the perimeter wall.

19. The collector according to claim 1, wherein composite component material is sandwiched between at least two layers of resiliently compressible material located within the interior of the perimeter wall.

20. The collector according to claim 1, wherein the composite component is in the form of a roll of material within the interior of the perimeter wall.

21. The collector according to claim 1, wherein the activated carbon is present at from 200 to 450 $gm^{-2}$.

22. The collector according to claim 1, wherein the composite component is not located within the perimeter wall of the collector but is located within a liner within the collection zone.

23. The collector as claimed in claim 20, wherein the composite component is also located within the perimeter wall.

24. The collector as claimed in claim 1, further comprising a liner.

25. The collector as claimed in claim 1, further comprising a removable liner.

26. The collector according to claim 1, wherein at least one of the layers of porous material is hydrophobic.

27. The collector according to claim 1, wherein the mat comprises one or more composite components.

* * * * *